United States Patent
Hanson

(10) Patent No.: US 7,267,309 B2
(45) Date of Patent: Sep. 11, 2007

(54) FURNITURE LEG EXTENSION AND LEVELING DEVICE AND METHOD FOR USE

(76) Inventor: Michael Hanson, 12724 Moore St., Cerritos, CA (US) 90703

( * ) Notice: Subject to any disclaimer, the term of this patent is extended or adjusted under 35 U.S.C. 154(b) by 0 days.

(21) Appl. No.: 10/980,732

(22) Filed: Nov. 2, 2004

(65) Prior Publication Data
US 2006/0091269 A1   May 4, 2006

(51) Int. Cl.
*F16M 11/24* (2006.01)
(52) U.S. Cl. ............... 248/188.4; 248/188.1; 411/178
(58) Field of Classification Search ........... 248/188.4, 248/188.5, 188.3, 188.2, 188.1; 108/147.22, 108/150; 292/14; 411/178, 389, 546
See application file for complete search history.

(56) References Cited

U.S. PATENT DOCUMENTS

| | | | | | |
|---|---|---|---|---|---|
| 2,254,973 | A | * | 9/1941 | Nalle ........................ | 16/19 |
| 2,476,366 | A | * | 7/1949 | Grimm .................... | 248/188.4 |
| 2,890,545 | A | * | 6/1959 | Fiddler .................... | 248/188.4 |
| 2,931,128 | A | | 4/1960 | Hiers et al. ................ | 45/139 |
| 3,150,853 | A | * | 9/1964 | Lisbin .................... | 248/188.4 |
| 3,595,180 | A | | 7/1971 | Swoyer .................... | 108/144 |
| 3,669,393 | A | * | 6/1972 | Paine et al. .............. | 248/188.4 |
| 4,043,239 | A | * | 8/1977 | DeFusco .................. | 411/337 |
| 4,108,407 | A | * | 8/1978 | Cable et al. .............. | 248/656 |
| 4,789,121 | A | * | 12/1988 | Gidseg et al. ........... | 248/188.2 |
| 5,791,612 | A | | 8/1998 | King ....................... | 248/188.4 |
| 5,881,979 | A | * | 3/1999 | Rozier et al. ........... | 248/188.5 |
| 6,186,453 | B1 | | 2/2001 | Redbone ................. | 248/188.4 |
| 6,196,505 | B1 | | 3/2001 | Wainwright ............. | 248/188.1 |
| 6,327,985 | B1 | * | 12/2001 | Frenkler et al. ....... | 108/147.19 |
| 6,470,612 | B1 | * | 10/2002 | Pountney ................ | 40/607.13 |

\* cited by examiner

*Primary Examiner*—Amy J. Sterling
(74) *Attorney, Agent, or Firm*—Steins & Associates, P.C.

(57) ABSTRACT

A Furniture Leg Extension and Leveling Device and Method for Use is disclosed. The device enables the user to adjust the height of a piece of furniture, such as a bathroom vanity cabinet. The device and method involves adding an extension member to each of the legs of the cabinet. The device attaches with a single custom bolt that threads into a threaded insert that is screwed into a bore cut into the bottom of the legs. The device further includes a leveling foot for accomplishing fine adjustment to leg height to account for minute floor surface irregularities. The custom bolt used for attaching the extension member has a threaded post at one end and a threaded bore formed at its other end.

15 Claims, 7 Drawing Sheets

FURNITURE LEG EXTENSION AND LEVELING DEVICE AND METHOD FOR USE

BACKGROUND OF THE INVENTION

1. Field of the Invention

This invention relates generally to furniture accessories and, more specifically, to a Furniture Leg Extension and Leveling Device and Method for Use.

2. Description of Related Art

Historically furniture designs conform to specified and standardized dimensions. In fact, many building codes specify what a particular height, for example, of a bathroom countertop must be. Through the evolution of the mass-produced furniture and cabinets, the manufacturers have virtually eliminated the possibility of purchasing cabinetry having other than standard heights. As a result, if a specialized situation arises, such as providing a vanity top for a child, the homeowner is typically limited to providing a platform for the child to stand on because it is virtually impossible to purchase a vanity that is low enough for the child to reach. Furthermore, in cases where an individual is taller than normal, they would prefer having a vanity height somewhat higher than the standardized height. In these cases, either the homeowner must purchase a custom made cabinet or they may create some less than attractive platform upon which the cabinet can sit.

FIG. 1 depicts a standard vanity cabinet to provide a background for the discussion of the present invention. FIG. 1 is a perspective view of a conventional vanity. As seen here, convention vanity 10 has a top 12 which in this case is a single molded piece. The top 12 sits upon a base cabinet 14 which here is made to resemble a piece of furniture. The cabinet 14 stands on four legs 16. The leg length L is fixed so that the cabinet height H is that specified in the standard cabinet height. It should be clear from this drawing it's virtually impossible to adjust the height of the vanity top 12 up or down in order to conform to other than standard applications.

What is needed then is an accessory for adjusting the height of the conventional vanity top to serve such non-standard applications.

SUMMARY OF THE INVENTION

In light of the aforementioned problems associated with the prior devices and methods, it is an object of the present invention to provide a Furniture Leg Extension and Leveling Device and Method for Use. The device should enable the user to adjust the height of a piece of furniture, such as a bathroom vanity cabinet. The device and method should employ adding an extension member to each of the legs of the cabinet. The device should attach with a single bolt that threads into a threaded insert that is screwed into a bore cut into the bottom of the legs. The device should further include a leveling foot for accomplishing fine adjustment to leg height to account for minute floor surface irregularities. The custom bolt used for attaching the extension member should have a threaded post at one end and a threaded bore formed at its other end.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Furniture Leg Extension and Leveling Device and Method for Use.

Figure 1:
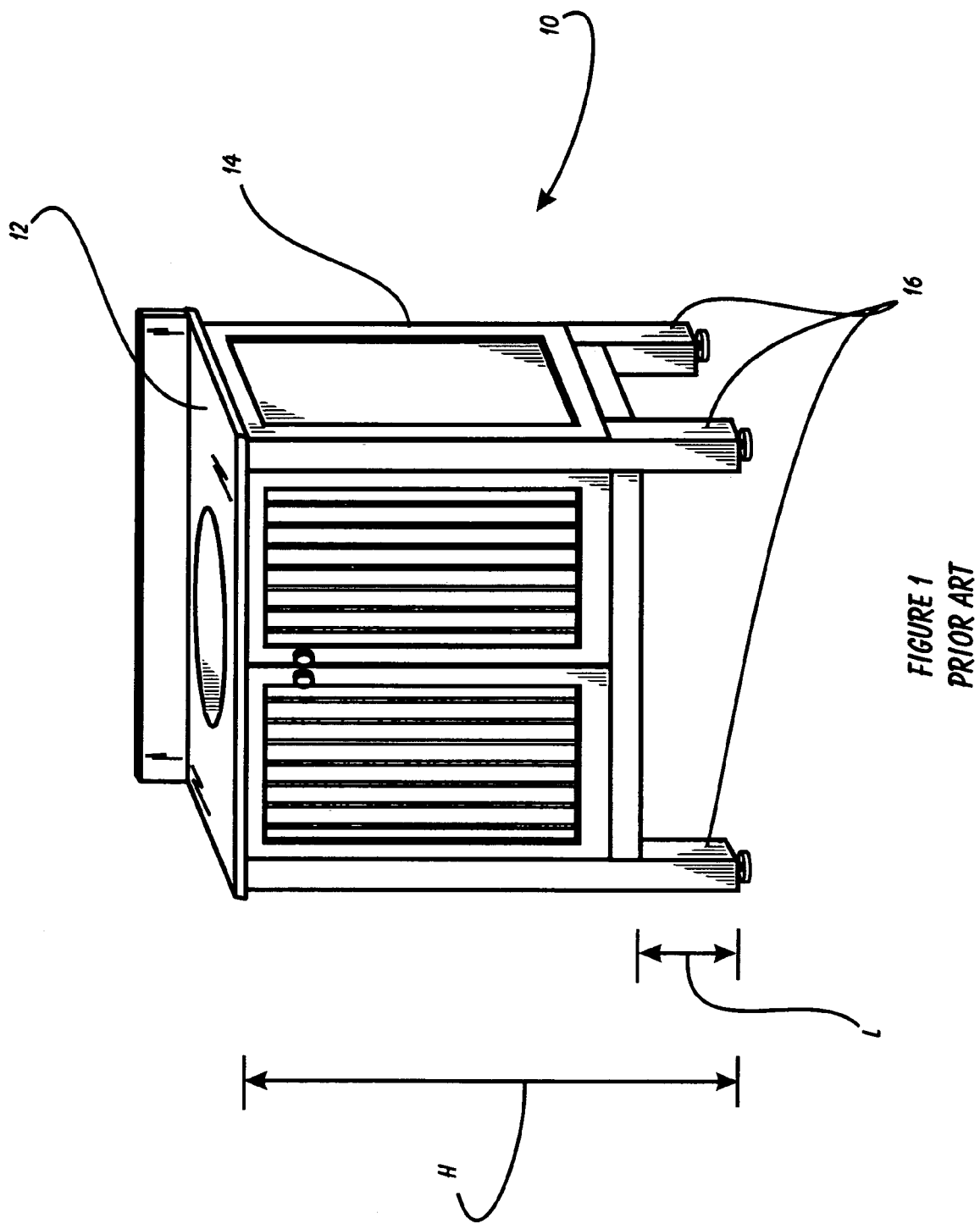
FIG. 1 is a perspective view of a conventional vanity.
Figure 2:
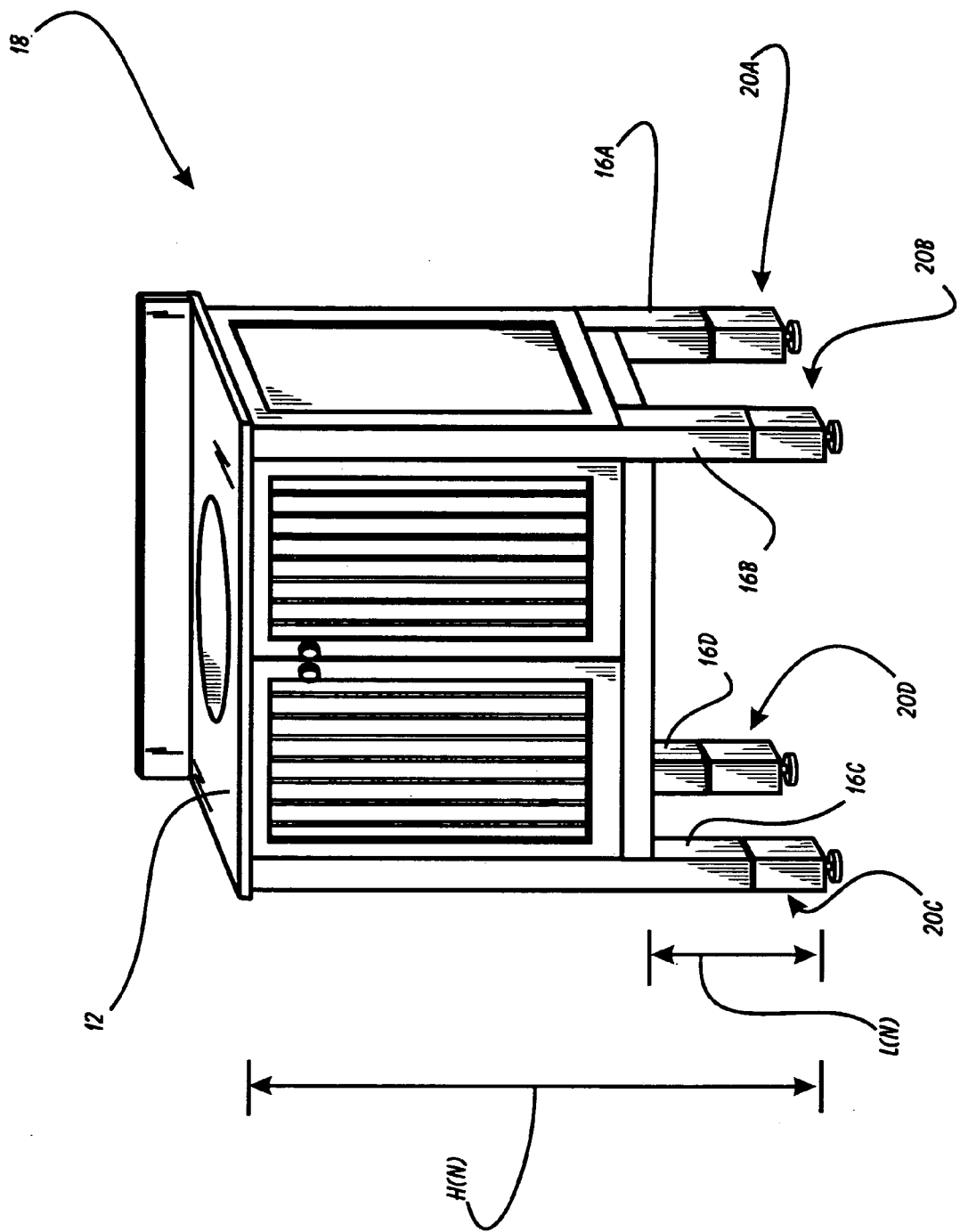
FIG. 2 is a perspective view of the vanity of FIG. 1 having extension assemblies of the present invention attached thereto.

The present invention can best be understood by initial consideration of FIG. 2. FIG. 2 is a perspective view of the vanity of FIG. 1 having extension assemblies of the present invention attached thereto. The tall vanity 18 depicted here is essentially the conventional vanity depicted in FIG. 1 to which extension assemblies 20 of the present invention have been added to each of the legs 16. As a result, the new leg length L(n) is longer than the standard length. As a result, the cabinet height H(n) has also been increased by an equivalent amount. If we turn to FIG. 3, we can examine the details of the extension assemblies 20 more closely.

Figure 3:
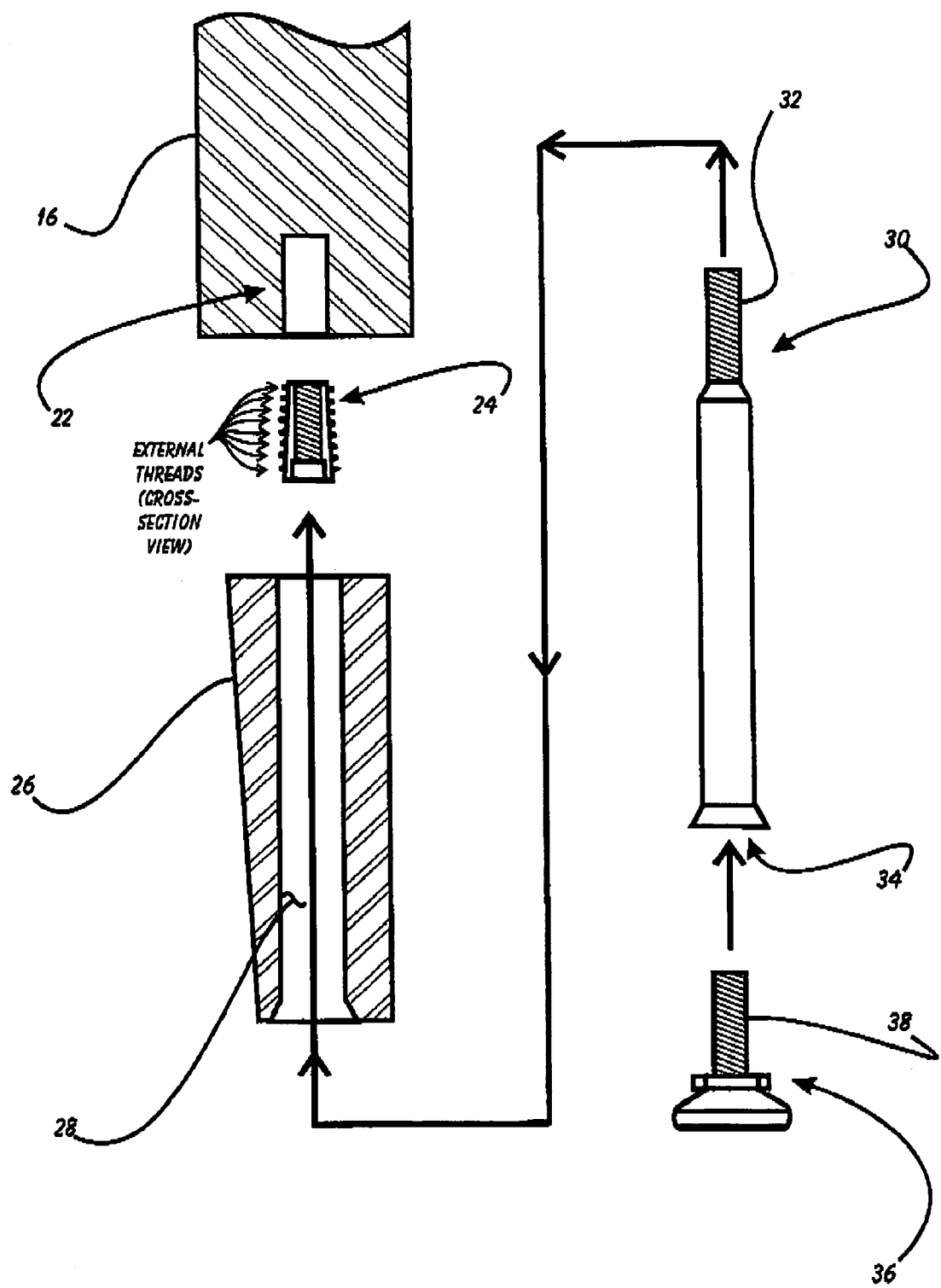
FIG. 3 is an exploded cutaway side view of an extension assembly of FIG. 2.

FIG. 3 is an exploded cutaway side view of an extension assembly of FIG. 2. The extension assembly 20 of the present invention comprises an extension member 26 which in this case is made from a substantially rectangular wooden block but in other versions might have a circular and/or other unique cross-section or shape. The body of the extension member 26 has a bore 28 cut through it. The extension member 26 is configured to align with the leg 16 of the vanity depicted in FIGS. 1 and 2. The leg 16 must be modified so that to provide a bore 22 centered on the leg 16 into which a threaded insert 24 is threadedly engaged. A customized extension bolt 30 defined by a threaded post 32 at its top and a threaded bore 34 at its bottom slips through the bore 28 of the extension member 26 and threadedly engages the treaded insert 24. The treaded bore 34 is cooperatively designed to accept the threaded post 38 of the leveler assembly 36. The combination of the leg 16 and the extension member 26 will appear to be a single, longer than normal, leg.

As depicted in FIG. 3, the threaded post 32 is defined by an exterior surface having a diameter and threads disposed thereon. Similarly, the threaded bore 34 is defined by an interior surface having a diameter and threads disposed thereon. The diameter and threads of the post 32 are sized such that they (i.e. the post 32) would engage the diameter and threads of the bore 34. In other words, the threaded post 32 of a first bolt 30 is sized to threadedly engage the threaded bore 34 of a second bolt 30. It follows, then, that the threaded bore of the threaded insert 24 is essentially the same diameter and thread pattern as the lower threaded bore 34. This ensures that the leveling assembly 36 can be taken from standard components (since the threaded post 38 diameter and thread pattern would be essentially the same as the upper threaded post 32). If we now turn to FIG. 4, we can see how the assembled leg looks.

Figure 4:
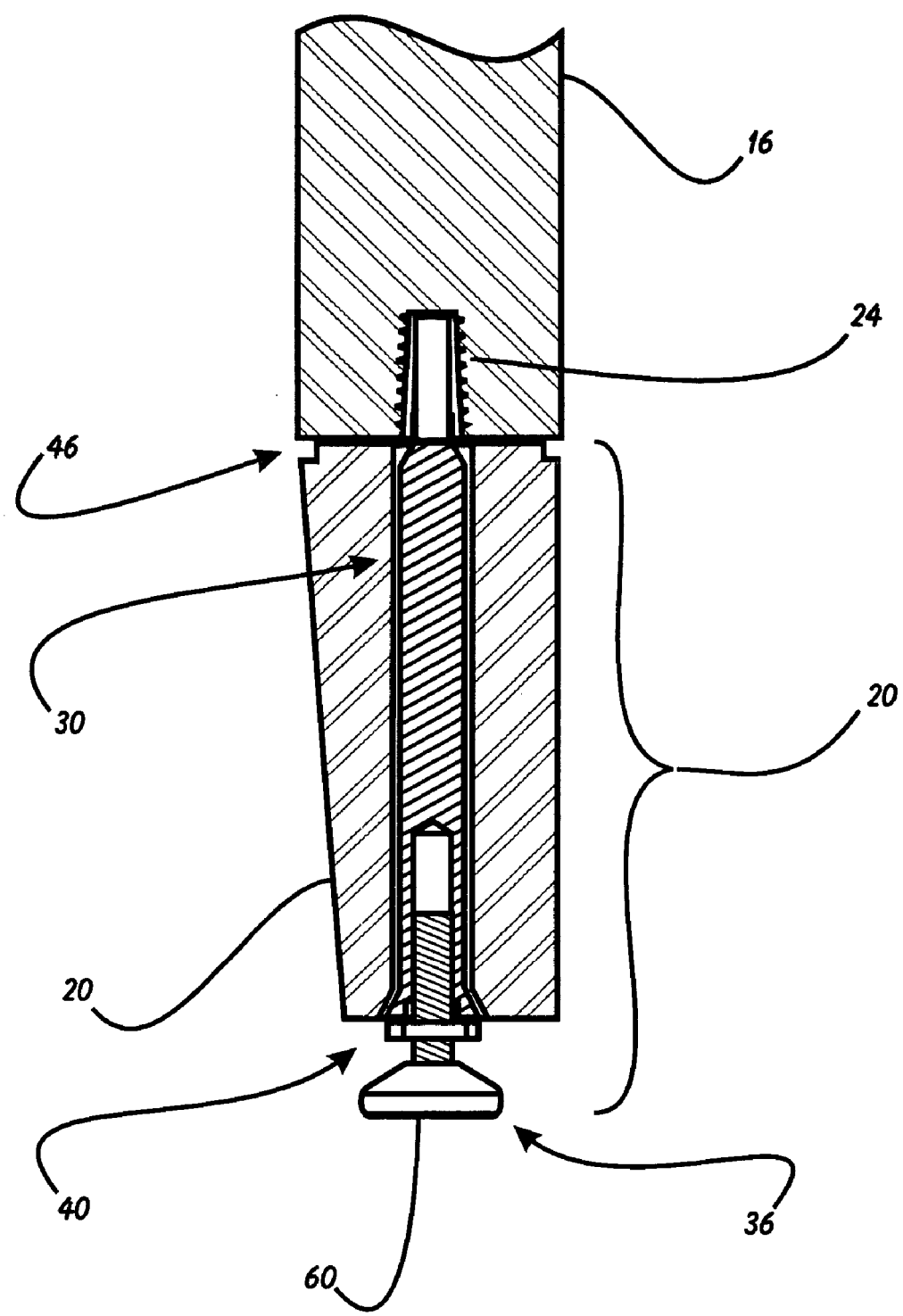
FIG. 4 is a cutaway side view of the extension assembly of FIGS. 2 and 3 attached to a furniture leg.

FIG. 4 is a cutaway side view of the extension assembly of FIGS. 2 and 3 attached to a furniture leg. As shown here, the threaded insert 24 which is threaded into the bore in the leg 16 is in threaded engagement with the extension bolt 30. The extension bolt 30 retains the extension member 26 and holds it tightly to the leg 16. Further shown here is a notch 46 formed around the perimeter of the upper surface of the extension member 26. This notch 46 may or may not be provided; if provided, it adds aesthetic value to the extended leg and hides any joint that might be visible where the leg 16 and the extension assembly 20 meet. The leveler assembly 36 threadedly engages the threaded bore formed in the bottom of the extension bolt 30. When the foot 60 has been adjusted up or down until the cabinet is level and at the exact height desired, locking nut 40 is rotated until it backs up against the bottom of the extension member thereby locking the leveler assembly 36 in place. If we now turn to FIGS. 5A, 5B and 5C, we can examine the extension member in more detail.

Figure 5A:
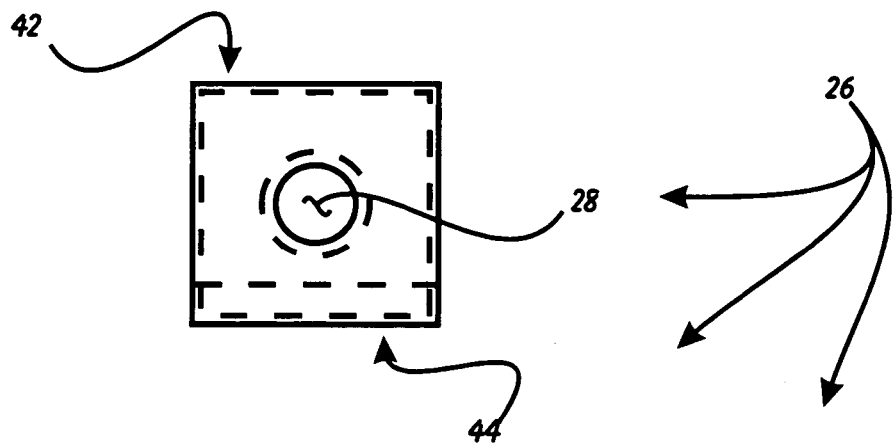
FIGS. 5A-5C are top, front and side views, respectfully, of the extension member of the assembly of FIGS. 2-4.
Figures 5B, 5C:
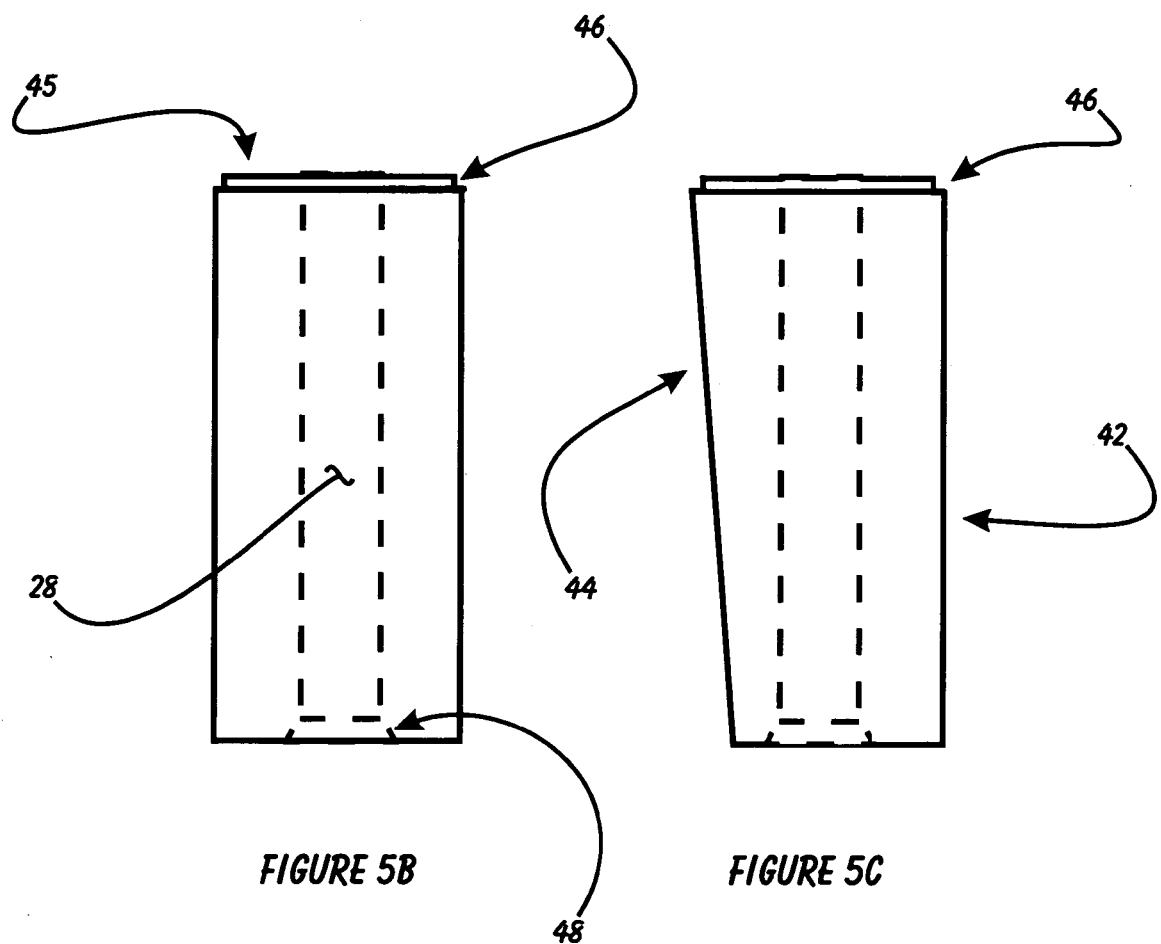
Figures 6A, 6B:
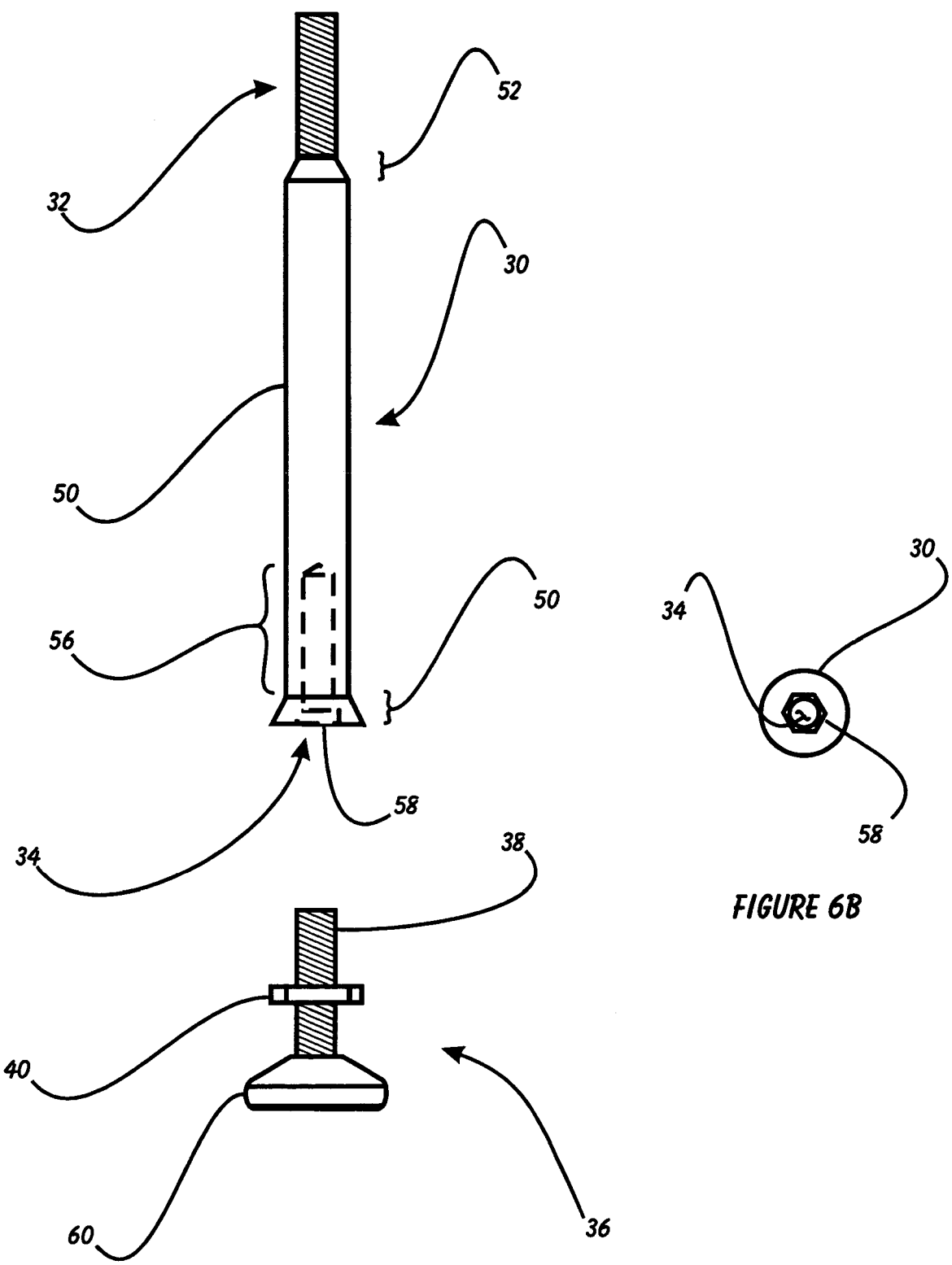
FIGS. 6A and 6B are side and bottom views, respectfully, of the extension bolt and leveler assembly of the device of FIGS. 2-4.

FIGS. 5A-5C are top, front and side views, respectfully, of the extension member of the assembly of FIGS. 2-4. In this substantially rectangular version of the extension member 26, the member 26 has a rear face 42 and a front face 44. The bore 28 penetrates the center of the top face 45 such that it is aligned cooperatively with the bore and threaded insert formed in the leg (see FIG. 4). As shown here, the notch 46 is cut into the periphery of the top face 45. Further shown here is a conical section 48 at the bottom end of the bore 28. This conical section 48 is provided to cooperate with an enlarged portion at the bottom of the extension bolt in order to retain the extension member 26 securely to the leg. As shown in FIG. 5C, in this version the front face 44 and the rear face 42 are not parallel to one another; in fact, the front face 44 tapers towards the rear face 42 from top to bottom. In other versions, the extension member 26 might be of consistent profile from top to bottom whether rectangular, circular or other design. FIGS. 6A and 6B depict the unique extension bolt of the present invention.

FIGS. 6A and 6B are side and bottom views, respectfully, of the extension bolt and leveler assembly of the device of FIGS. 2-4. The extension bolt 30 is defined by a threaded post 32 at its top end and a conical shoulder 52 transitioning from the threaded post 32 to the shaft 50. At the lower end of the shaft 50, the threaded bore 34 is formed. The threaded bore 34 is defined by a threaded portion 56 and a socket 58. As shown in FIG. 6B, the socket 58 is provided with flat surfaces around its periphery in order to engage a standard and/or specialized wrench or tool that the user will use to rotate the bolt 30 when it is engaging the threaded insert of the leg. The bolt 30 is further defined by a conical shoulder 54 at its lower extremity. This conical shoulder 54 is configured to cooperate with the conical section of the extension member (see FIG. 5B) to retain the extension member to the leg. The bolt 30 (and extension member (see FIG. 5B) are available in a variety of different lengths in order to provide wide height-adjustment variety.

The threaded portion 56 is cooperatively designed to accept a threaded post 38 of the leveler assembly 36. As discussed above, when the cabinet has been leveled as necessary by rotating the leveler assembly 36 one way or the other, the locking nut 40 is then backed up against the bottom of the extension bolt 30 so that the foot 60 is fully engaged with the ground at all four legs. It should be understood that although not depicted here, the threaded insert is defined by an internally threaded configured to accept the threaded post 32 of the extension bolt 30 as well as an exterior threaded surface to engage the wood of a bore formed in the leg 16. Furthermore, the threaded insert has a socket similar to the socket 58 that is used to insert a tool for turning the threaded insert while it is engaging the bore formed in the leg 16. If we now turn to FIG. 7, we can examine the method for installing the extension assembly of the present invention.

Figure 7:
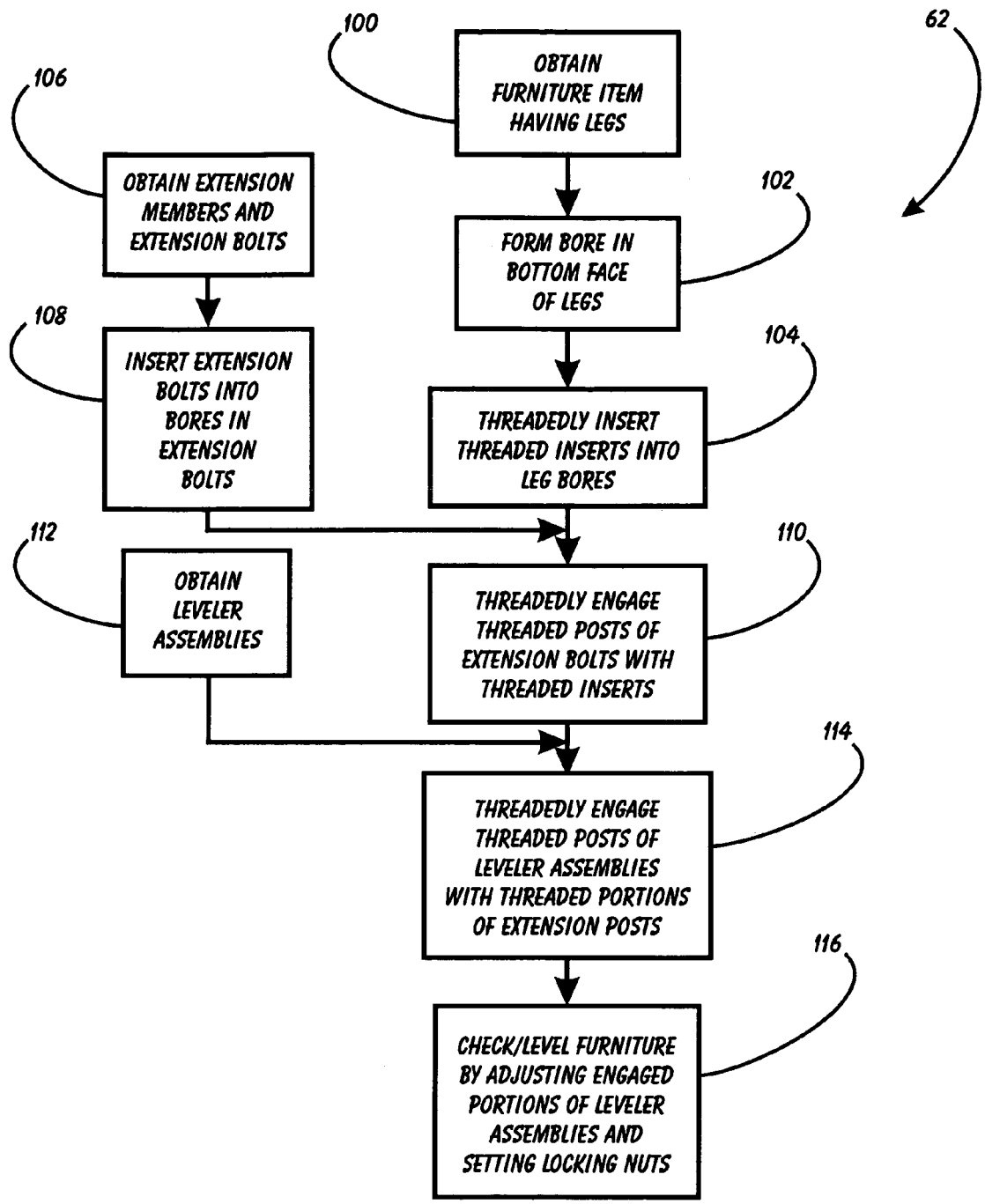
FIG. 7 is a flowchart depicting the installation method of the present invention.

FIG. 7 is a flowchart depicting the installation method of the present invention. The furniture height increase method 62 of the present invention starts by obtaining a furniture item having legs 100. Bores are then formed in the bottom face of each of the legs 102 after which threaded inserts are each threadedly inserted into each of the formed leg bores 104. At some point previous to this step or commencing at this step, extension members and extension bolts are obtained 106. The extension bolts are then inserted into bores formed in the extension members 108 and the threaded posts of the extension bolts are threadedly engaged with the treaded inserts that have been inserted into the leg bores 110. The lever assemblies, at some point, are obtained 112 and the threaded posts of the leveler assemblies are threadedly engaged with the threaded portions of the extension bolts 114.

Finally, the furniture level is checked and adjusted by adjusting the engaged portions of the leveler assemblies and then setting locking nuts 116.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A device for extending a furniture leg, comprising
an extension member defined by a top face, a bottom face and a longitudinal bore interconnecting said top and bottom faces, said top and bottom faces separated by an extension member height;
an extension bolt, formed from a single piece, having a top end and a bottom end, said top end defined by an upper threaded post and said bottom end defined by a lower threaded bore, said threads on said upper post extending less than the entire length of said bolt, said upper threaded post defining external threads and an external diameter and said lower threaded bore defines internal threads formed on an internal diameter, said external diameter and threads are cooperatively sized to be engagable with said internal diameter and threads, said extension bolt defining a length that exceeds said extension member height; and
a leveling assembly defined by a foot and a threaded post extending upwardly therefrom, said leveling assembly threaded post configured to engage said lower threaded bore.

2. The device of claim 1, further comprising:
a threaded insert configured to threadedly engaging a bore formed in said leg, said insert comprising an outer threaded surface and an inner threaded bore, said inner threaded bore cooperatively designed to accept said upper threaded post, and further defining an internal diameter and internal threads formed thereon that are both substantially the same as said extension bolt threaded bore internal diameter and internal threads.

3. The device of claim 2, wherein said extension bolt comprises:
a first end terminating in said upper threaded post; and
a second end opposite said first end, said second end comprising a socket formed therein, said lower threaded bore opening into said socket.

4. The device of claim 3, wherein:
said upper threaded post defines a first diameter; and
said extension bolt further defines a non-threaded shaft defining a second diameter, said second diameter differing from said first diameter, said shaft and said threaded post interconnected by a conical shoulder.

5. The device of claim 4, wherein said shaft cooperates with said longitudinal bore to be acceptable within said longitudinal bore.

6. The device of claim 5, wherein said extension member is further defined by a front face opposite a rear face, said front face tapering towards said back face.

7. The device of claim 6, wherein said leveling assembly further comprises a locking member threadedly engaging said leveling assembly threaded post.

8. A furniture leg extension and leveling assembly for use with a furniture leg, said furniture leg defining an outer shape having a profile at its lower end and an internal bore formed therein, comprising:
an extension member defined by a top face and a bottom face, said top face defining an outer shape having a profile substantially identical to said outer shape profile of said lower end of said furniture leg;
an extension bolt, formed from a single piece, inserted through a bore formed in said extension member and threadedly engaging a threaded insert into said leg, said threaded insert defining an internal bore having an internal diameter and internal threads formed on internal bore; and
a leveling assembly threadedly engaging said extension bolt and further defined by a foot, said leveling assembly defining a threaded post having an external diameter and external threads formed on said post, said insert threaded bore internal diameter and threads and said assembly threaded post external diameter and external threads sized to be threadedly engagable.

9. The assembly of claim 8, wherein:
said threaded insert threadedly engages the bore formed in a leg, said insert comprising an outer threaded surface and an inner threaded bore, said inner threaded bore cooperatively designed to accept said upper threaded post.

10. The assembly of claim 9, wherein said extension bolt comprises:
a first end terminating in said upper threaded post; and
a second end opposite said first end, said second end comprising a socket formed therein, said lower threaded bore opening into said socket.

11. The assembly of claim 10, wherein:
said second end of said extension bolt is defined by a bottom face; and
said socket comprises a wrench-accepting depression formed in said bottom face.

12. The assembly of claim 11, wherein said threaded insert is further defined by a bottom face, said bottom face of said threaded insert further defined by at least one tool-engagable depression in said bottom face of said threaded portion.

13. The assembly of claim 12, wherein said shaft cooperates with said longitudinal bore to be acceptable within said longitudinal bore.

14. The assembly of claim 13, wherein said extension member is further defined by a front face opposite a rear face, said front face tapering towards said back face.

15. The assembly of claim 14, wherein said leveling assembly further comprises a locking member threadedly engaging said leveling assembly threaded post.

* * * * *